United States Patent
Nathuji et al.

(10) Patent No.: US 9,009,384 B2
(45) Date of Patent: Apr. 14, 2015

(54) VIRTUAL MACHINE MEMORY MANAGEMENT IN SYSTEMS WITH ASYMMETRIC MEMORY

(75) Inventors: Ripal Babubhai Nathuji, Bothell, WA (US); David Tennyson Harper, III, Seattle, WA (US); Parag Sharma, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 209 days.

(21) Appl. No.: 12/857,562

(22) Filed: Aug. 17, 2010

(65) Prior Publication Data

US 2012/0047312 A1 Feb. 23, 2012

(51) Int. Cl.
*G06F 12/10* (2006.01)
*G06F 9/50* (2006.01)
*G06F 9/38* (2006.01)

(52) U.S. Cl.
CPC ............ *G06F 9/5016* (2013.01); *G06F 9/3832* (2013.01); *G06F 9/5077* (2013.01)

(58) Field of Classification Search
CPC .................................................. G06F 12/109
USPC ................ 711/6, 170, 203; 718/105
See application file for complete search history.

(56) References Cited

U.S. PATENT DOCUMENTS

| | | | |
|---|---|---|---|
| 2005/0114855 A1* | 5/2005 | Baumberger | 718/1 |
| 2006/0143384 A1* | 6/2006 | Hughes et al. | 711/130 |
| 2007/0136402 A1 | 6/2007 | Grose et al. | |
| 2009/0031072 A1* | 1/2009 | Sartore | 711/102 |
| 2009/0106571 A1 | 4/2009 | Low et al. | |
| 2009/0300173 A1 | 12/2009 | Bakman et al. | |
| 2011/0153978 A1* | 6/2011 | Chalemin et al. | 711/171 |

FOREIGN PATENT DOCUMENTS

| | | |
|---|---|---|
| CN | 101040262 A | 9/2007 |
| CN | 101201885 A | 6/2008 |
| CN | 101334825 A | 12/2008 |
| CN | 101655798 | 2/2010 |

OTHER PUBLICATIONS

Gavrilovska, et al., "High-Performance Hypervisor Architectures: Virtualization in HPC Systems", Retrieved at << http://www.csm.ornl.gov/srt/hpcvirt07/papers/paper10.pdf >>, 1st Workshop on System-level Virtualization for High Performance Computing, HPCVirt, Mar. 20, 2007, pp. 1-8.

(Continued)

*Primary Examiner* — Jae Yu
(74) *Attorney, Agent, or Firm* — Micah Goldsmith; Judy Yee; Micky Minhas (57) ABSTRACT

A system is described herein that includes a predictor component that predicts accesses to portions of asymmetric memory pools in a computing system by a virtual machine, wherein the asymmetric memory pools comprise a first memory and a second memory, and wherein performance characteristics of the first memory are non-identical to performance of the second memory. The system also includes a memory management system that allocates portions of the first memory to the virtual machine based at least in part upon the accesses to the asymmetric memory pools predicted by the predictor component.

20 Claims, 8 Drawing Sheets

(56) References Cited

OTHER PUBLICATIONS

Wood, et al., "Black-Box and Gray-Box Strategies for Virtual Machine Migration", Retrieved at << http://www.cs.umass.edu/~arun/papers/sandpiper.pdf >>, Proceedings of the 4th USENIX Symposium on Networked Systems Design and Implementation, 2007, pp. 1-14.

Lu, et al., "Virtual Machine Memory Access Tracing with Hypervisor Exclusive Cache", Retrieved at << http://www.cs.rochester.edu/~kshen/papers/usenix2007-lu.pdf >>, USENIX Annual Technical Conference on Proceedings of the USENIX Annual Technical Conference, Jun. 17-22, 2007, pp. 1-15.

Tickoo, et al., "Modeling Virtual Machine Performance: Challenges and Approaches", Retrieved at << http://www.sigmetrics.org/sigmetrics/workshops/papers_hotmetrics/session3_1.pdf >>, ACM SIGMETRICS Performance Evaluation Review, vol. 37, No. 3, Dec. 2009, pp. 1-5.

"Virtual Machine Memory Guest Utilization Forecast Details", Retrieved at << http://publib.boulder.ibm.com/infocenter/tivihelp/v15r1/index.jsp?topic=/com.ibm.kpa.pc.doc/wsp_vm_mem_vm_gd.html >>, Version 6.2.2, Retrieved Date: Jun. 21, 2010, p. 1.

Lim, et al., "Understanding and Designing New Server Architectures for Emerging Warehouse-Computing Environments", Retrieved at << http://www.cs.ucsb.edu/~chong/290N/WarehouseWorkloadsISCA08.pdf >>, International Symposium on Computer Architecture, Proceedings of the 35th Annual International Symposium on Computer Architecture, Jun. 21-25, 2008, pp. 315-326.

Lim, et al., "Disaggregated Memory for Expansion and Sharing in Blade Servers", Retrieved at << http://www.eecs.umich.edu/~twenisch/papers/isca09-disaggregate.pdf >>, ACM SIGARCH Computer Architecture News, vol. 37, No. 3, Jun. 2009, pp. 1-12.

Waldspurger, Carl A., "Memory Resource Management in VMware ESX Server", Retrieved at << http://www.stanford.edu/class/cs240/readings/waldspurger.pdf >>, Proceedings of the 5th symposium on Operating systems design and implementation, ACM SIGOPS Operating Systems Review, vol. 36, No. SI, OSDI '02, 2002, pp. 1-14.

Barham, et al., "Xen and the Art of Virtualization", Retrieved at << http://www.cl.cam.ac.uk/research/srg/netos/papers/2003-xensosp.pdf >>, ACM Symposium on Operating Systems Principles, Proceedings of the nineteenth ACM symposium on Operating systems principles, Oct. 19-22, 2003, pp. 1-14.

Black, et al., "Die Stacking (3d) Microarchitecture", Retrieved at << http://citeseerx.ist.psu.edu/viewdoc/download?doi=10.1.1.130.6198&rep=rep1&type=pdf >>, International Symposium on Microarchitecture, Proceedings of the 39th Annual IEEE/ACM International Symposium on Microarchitecture, Dec. 9-13, 2006, pp. 1-11.

Condit, et al., "Better I/O through Byteaddressable Persistent Memory", Retrieved at << http://citeseerx.ist.psu.edu/viewdoc/download?doi=10.1.1.148.3615&rep=rep1&type=pdf >>, ACM Symposium on Operating Systems Principles, Proceedings of the ACM SIGOPS 22nd symposium on Operating systems principles, Oct. 11-14, 2009, pp. 1-14.

Gupta, et al., "Difference Engine: Harnessing Memory Redundancy in Virtual Machines", Retrieved at << http://www.usenix.org/events/osdi08/tech/full_papers/gupta/gupta.pdf >>, in 8th USENIX Symposium on Operating System Design and Implementation, OSDI, Dec. 2008, pp. 309-322.

Heo, et al., "Memory Overbooking and Dynamic Control of Xen Virtual Machines in Consolidated Environments", Retrieved at << http://www.cs.uiuc.edu/homes/jinheo/papers/IM2009-final.pdf >>, Proceedings of the 11th IFIP/IEEE international conference on Symposium on Integrated Network Management, Jun. 1-5, 2009, pp. 1-8.

Howard, et al., "A 48-Core is-32 Message-Passing Processor with DVFS in 45nm CMOS", Retrieved at << http://techresearch.intel.com/UserFiles/en-us/File/terascale/SCC_Symposium_RCCE_Message_Passing_12feb2010.pdf >>, IEEE International Solid-State Circuits Conference Digest of Technical Papers (ISSCC), Feb. 7-11, 2010, pp. 1-51.

Kgil, et al., "Picoserver: Using 3d Stacking Technology to Enable a Compact Energy Efficient Chip Multiprocessor", Retrieved at << http://citeseerx.ist.psu.edu/viewdoc/download;jsessionid=C0C89218583CF9694FF69CE7C83160AA?doi=10.1.1.80.1372&rep=rep1&type=pdf >>, Proceedings of the 2006 ASPLOS Conference, ACM SIGOPS Operating Systems Review, vol. 40, No. 5, Dec. 2006, pp. 1-12.

Koh, et al., "An Analysis of Performance Interference Effects in Virtual Environments", Retrieved at << http://citeseerx.ist.psu.edu/viewdoc/download?doi=10.1.1.133.8052&rep=rep1&type=pdf >>, IEEE International Symposium on Performance Analysis of Systems & Software, ISPASS, Apr. 25-27, 2007, pp. 1-10.

Kumar, et al., "Single-ISA Heterogeneous Multi-core Architectures for Multithreaded Workload Performance", Retrieved at << http://citeseerx.ist.psu.edu/viewdoc/download?doi=10.1.1.10.89&rep=rep1&type=pdf >>, In Proceedings of the 31st International Symposium on Computer Architecture, Jun. 2004, pp. 1-12.

Liu, et al., "Bridging the Processor-Memory Performance Gap with 3D IC Technology", Retrieved at << http://users.ices.utexas.edu/~burtscher/papers/dt05.pdf >>, IEEE Design & Test of Computers, vol. 22, No. 6, Nov.-Dec. 2005, pp. 556-564.

Loh, Gabriel H., "3D-Stacked Memory Architectures for Multi-core Processors", Retrieved at << http://www.cc.gatech.edu/~loh/Papers/isca2008-3Ddram.pdf >>, International Symposium on Computer Architecture, Proceedings of the 35th Annual International Symposium on Computer Architecture, Jun. 21-25, 2008, pp. 1-14.

Luk, et al., "Qilin: Exploiting Parallelism on Heterogeneous Multiprocessors with Adaptive Mapping", Retrieved at << http://www.cc.gatech.edu/~hyesoon/qilin_pldi09_public.pdf >>, International Symposium on Microarchitecture Proceedings of the 42nd Annual IEEE/ACM International Symposium on Microarchitecture, Dec. 12-16, 2009, pp. 1-10.

Miló, et al., "Satori: Enlightened Page Sharing", Retrieved at << http://www.cl.cam.ac.uk/~gm281/papers/milos-satori.pdf >>, In Usenix, 2009, pp. 1-14.

Nathuji, et al., "Qclouds: Managing Performance Interference Effects for QOS-Aware Clouds", Retrieved at << http://research.microsoft.com/pubs/118372/QClouds.pdf >>, EuroSys, Apr. 13-16, 2010, pp. 1-14.

Nathuji, et al., "Virtualpower: Coordinated Power Management in Virtualized Enterprise Systems", Retrieved at << http://www.sosp2007.org/papers/sosp111-nathuji.pdf >>, ACM Symposium on Operating Systems Principles, Proceedings of twenty-first ACM SIGOPS symposium on Operating systems principles, Oct. 14-17, 2007, pp. 1-14.

Padala, et al., "Automated Control of Multiple Virtualized Resources", Retrieved at << http://www.hpl.hp.com/techreports/2008/HPL-2008-123R1.pdf >>, European Conference on Computer Systems, Proceedings of the 4th ACM European conference on Computer systems, Apr. 1-3, 2009, pp. 1-17.

Padala, et al., "Adaptive Control of Virtualized Resources in Utility Computing Environments", Retrieved at << http://www.hpl.hp.com/research/ssp/papers/2007-03-Eurosys-Silos.pdf >>, European Conference on Computer Systems, Proceedings of the 2nd ACM SIGOPS/EuroSys European Conference on Computer Systems, Mar. 21-23, 2007, pp. 1-14.

Saez, et al., "A Comprehensive Scheduler for Asymmetric Multicore Systems", Retrieved at << http://www.cs.sfu.ca/~fedorova/papers/eurosys163-saez.pdf >>, European Conference on Computer Systems, Proceedings of the 5th European conference on Computer systems, Apr. 13-16, 2010, pp. 1-14.

Stoess, et al., "Energy Management for Hypervisor-Based Virtual Machines", Retrieved at << http://l4ka.org/publications/2007/stoess07energymgmtvms.pdf >>, USENIX Annual Technical Conference on Proceedings of the USENIX Annual Technical Conference, Jun. 17-22, 2007, pp. 1-14.

"VMWARE ESX", Retrieved at << http://www.vmware.com/products/esx >>, Retrieved Date: Jun. 22, 2010, pp. 1-4.

"Windows Server 2008 R2 Hyper-V", Retrieved at << http://www.microsoft.com/hyperv >>, Retrieved Date: Jun. 22, 2010, pp. 1-2.

Wood, et al., "Memory Buddies: Exploiting Page Sharing for Smart Colocation in Virtualized Data Centers", Retrieved at << http://lass.cs.umass.edu/papers/pdf/VEE09-membuds.pdf >>, ACM/Usenix International Conference on Virtual Execution Environments, Pro- (56) References Cited

OTHER PUBLICATIONS ceedings of the 2009 ACM SIGPLAN/SIGOPS international conference on Virtual execution environments, Mar. 11-13, 2009, pp. 1-10.
Wulf, et al., "Hitting the Memory Wall: Implications of the Obvious", Retrieved at << http://www.cs.virginia.edu/papers/Hitting_Memory_Wall-wulf94.pdf >>, ACM SIGARCH Computer Architecture News, vol. 23, No. 1, Mar. 1995, pp. 20-24.
Xie, et al., "Pipp: Promotion/Insertion Pseudo-Partitioning of Multi-Core Shared Caches", Retrieved at << http://www.cc.gatech.edu/~loh/Papers/isca2009-pipp.pdf >>, ACM SIGARCH Computer Architecture News, vol. 37, No. 3, Jun. 2009, pp. 1-10.
Ye, et al., "Prototyping a Hybrid Main Memory using a Virtual Machine Monitor", Retrieved at << http://www.ece.neu.edu/students/dye/papers/iccd08.pdf >>, Proceedings 26th International Conference on Computer Design, ICCD, Oct. 12-15, 2008, pp. 1-8.
Zhao, et al., "Cachescouts: Fine-Grain Monitoring of Shared Caches in CMP Platforms", Retrieved at << http:// citeseerx.ist.psu.edu/viewdoc/download?doi=10.1.1.114.9744&rep=rep1&type=pdf >>, PACT, Proceedings of the 16th International Conference on Parallel Architecture and Compilation Techniques, Sep. 15-19, 2007, pp. 1-11.
Zhao, et al., "Dynamic Memory Balancing for Virtual Machines", Retrieved at << http://www.google.co.in/url?sa=t&source=web&cd=1&ved=0CBsQFjAA&url=http%3A%2F%2Fciteseerx.ist.psu.edu%2Fviewdoc%2Fdownload%3Fdoi%3D10.1.1.159.573%26rep%3Drep1%26type%3Dpdf&rct=j&q=Dynamic+memory+balancing+for+virtual+machines&ei=nVogTK7LIcKRnwfPIPBW&usg=AFQjCNGcvL5ZAWwt3e8qWt1DHmwQh7oFlg >>, ACM/Usenix International Conference On Virtual Execution Environments, Proceedings of the 2009 ACM SIGPLAN/SIGOPS international conference on virtual execution environments, Mar. 11-13, 2009, pp. 1-10.
"Notice on the First Office Action", The State Intellectual Property Office of the People's Republic of China, Issue Date: Nov. 29, 2013, pp. 1-13 (Including English Translation).
"Second Office Action and Search Report Received for China Patent Application No. 201110245091.1", Mailed Date: Jul. 25, 2014, 13 Pages.
"Reply to Second Office Action and Search Report for China Patent Application No. 2011102450911", Filed Date: Oct. 9, 2014, 14 Pages.

\* cited by examiner

VIRTUAL MACHINE MEMORY MANAGEMENT IN SYSTEMS WITH ASYMMETRIC MEMORY

BACKGROUND

Currently, commercial cloud computing services are equipped to provide businesses with computation and data storage services, thereby allowing businesses to replace or supplement privately owned information technology (IT) assets, alleviating the burden of managing and maintaining such privately owned IT assets. While feasibility of cloud computing has grown over the last several years, there exists some technological hurdles to overcome before cloud computing becomes adopted in a widespread manner.

One problem that is desirably addressed pertains to the sharing of computing resources by multiple customers. Cloud computing platforms routinely employ virtualization to encapsulate workloads in virtual machines, which are then consolidated on cloud computing servers. Thus, a particular cloud computing server may have multiple virtual machines executing thereon that correspond to multiple different customers. Ideally, for any customer utilizing the server, the use of resources on the server by other virtual machines corresponding to other customers is transparent. Currently, cloud computing providers charge fees to customers based upon usage or reservation of resources such as, but not limited to, CPU hours, storage capacity, and network bandwidth. Service level agreements between the customers and cloud computing providers are typically based upon resource availability, such as guarantees in terms of system uptime, I/O requests, etc. Accordingly, a customer can enter into an agreement with a cloud computing services provider, wherein such agreement specifies an amount of resources that will be reserved or made available to the customer, as well as guarantees in terms of system uptime, etc.

If a customer is not utilizing all available resources of a server, however, it is in the interests of the cloud computing services provider to cause the customer to share computing resources with other customers. This can be undertaken through virtualization, such that workloads of a customer can be encapsulated in a virtual machine, and many virtual machines can be consolidated on a server. Virtualization can be useful in connection with the co-hosting of independent workloads by providing fault isolation, thereby preventing failures in an application corresponding to one customer from propagating to another application that corresponds to another customer.

Currently, various virtual machine memory management systems exist that govern how data is treated when memory is over-provisioned. These systems generally pertain to identifying when data is to be paged in from a hard disk to memory or paged out from memory to hard disk. Such systems, however, are not optimized with respect to evolving computer hardware architectures.

SUMMARY

The following is a brief summary of subject matter that is described in greater detail herein. This summary is not intended to be limiting as to the scope of the claims.

Described herein are various technologies pertaining to managing asymmetric memory resources on virtualized systems. Processors are continually being developed with ever-increasing performance capabilities. Recently, however, power and complexity associated with these processors have caused the semiconductor industry to transition towards multi-core architectures that include several cores, wherein each core often has a simpler, smaller design when compared with the designs of most advanced processors. This increasing number of cores on processors places an increasing amount of pressure on memory, both in terms of performance and capacity. Accordingly, hardware architecture designs are proposed where processors have access to asymmetric memory pools, wherein asymmetric memory pools comprise a first memory and a second memory, and wherein the performance characteristics of the first memory are non-identical to the performance characteristics of the second memory. In other words, the first memory may have lower latency and higher bandwidth with respect to a processor or processor core when compared to latency and bandwidth of the second memory.

In accordance with an aspect described in greater detail herein, a plurality of virtual machines can execute on a virtualized system that utilizes asymmetric memory pools. In other words, one or more of the virtualized machines can be assigned an address space that is across memories that have differing performance characteristics. Thus, a virtual machine executing in the virtualized system may be allocated a portion (e.g., a plurality of pages) of a first memory and a portion of a second memory, wherein the first memory and the second memory have differing performance characteristics. The first memory and second memory can be monitored to ascertain, over a threshold period of time, how the virtual machine accesses the pages in the first memory and the pages in the second memory that have been allocated to such virtual machine. The monitored accesses to the first memory and the second memory, for a plurality of virtual machines, can be utilized to predict future accesses to the first memory and second memory by the plurality of virtual machines. These predicted future accesses may then be utilized to dynamically allocate asymmetric memory amongst the plurality of virtual machines. That is, memory from asymmetric memory can be dynamically allocated to substantially optimize execution of a plurality of virtual machines in a virtualized environment.

Additionally, for any given virtual machine executing in the virtualized environment, pages between different pools of memory (the first memory and the second memory) can be actively managed. For example, the prediction discussed above can be employed to determine whether a page allocated to a particular virtual machine should be migrated from the first memory to the second memory in the address space of the virtual machine or vice versa.

Other aspects will be appreciated upon reading and understanding the attached figures and description.

DETAILED DESCRIPTION

Various technologies pertaining to managing asymmetric memory pools in a virtualized system will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

Figure 1:
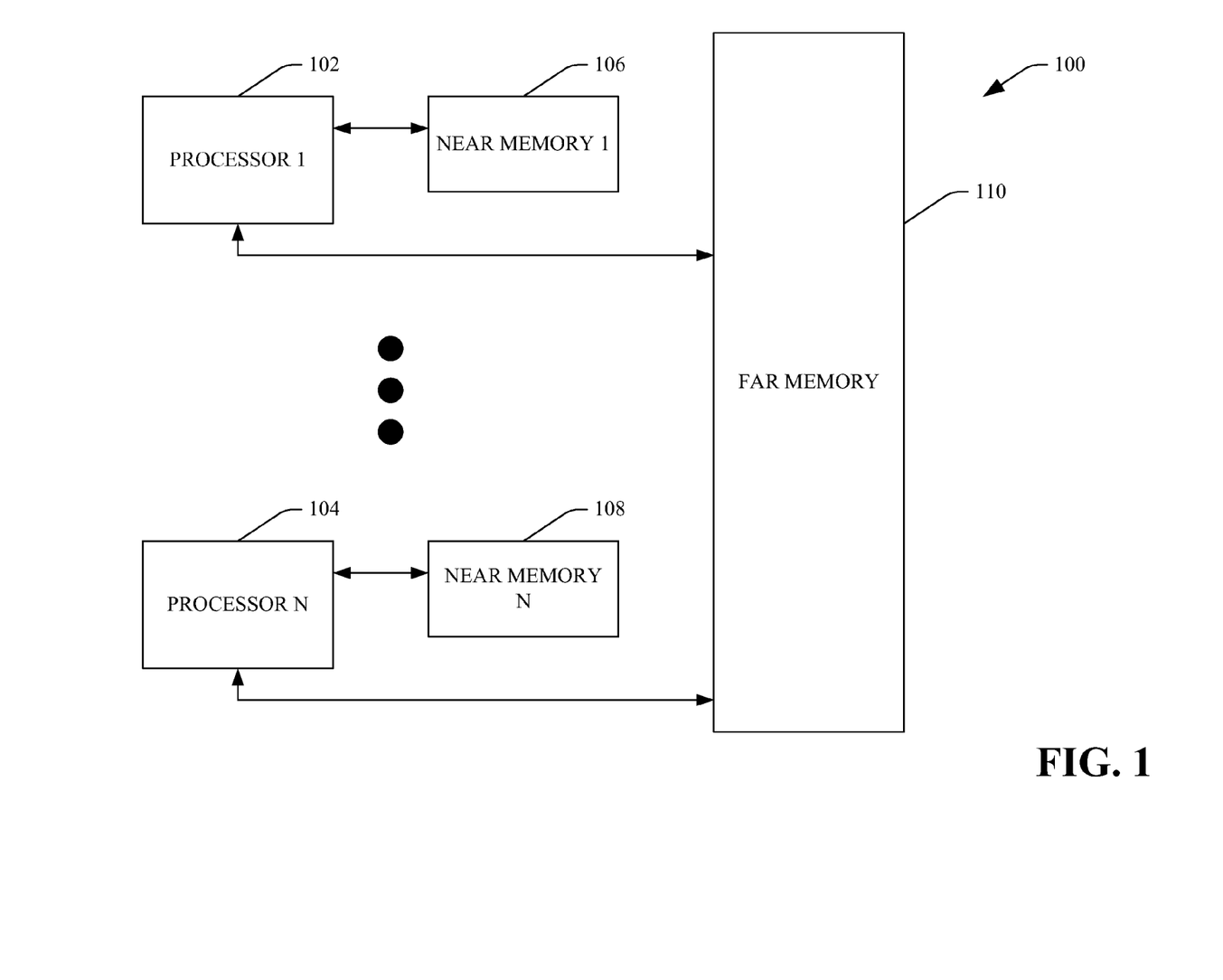
FIG. 1 is a functional block diagram of an exemplary processor/memory architecture in a computing system.

With reference to FIG. 1, an exemplary hardware architecture 100 that underlies various aspects disclosed herein is illustrated. The architecture 100 comprises a plurality of processors 102-104. Pursuant to an example, one or more of the processors 102-104 may be multi-core processors. The architecture 100 further comprises a plurality of first memories 106-108, which may also be referred to herein as "near" memories. The first near memory 106 may be accessible solely to the first processor 102, and the Nth near memory may be accessible solely to the Nth processor 108. It is to be understood, however, that each of the near memories 106-108 may be accessible to multiple processors or processor cores.

The architecture 100 also comprises a second memory 110 that can be accessible to both the first processor 102 and the Nth processor, wherein the second memory 110 may also be referred to herein as "far" memory. Pursuant to an example, the near memories 106-108 may have performance characteristics with respect to the processors 102-104 that are non-similar to performance characteristics of the far memory 110 with respect to the processors 102-104. For instance, the near memories 106-108 may have better performance with respect to the processors 102-104 when compared to the far memory 110, wherein better performance can refer to lower latency and/or higher bandwidth. The different memories with different performance characteristics, each being accessible to a processor, can be referred to as asymmetric memory, wherein pools of asymmetric memory refer to different memories having different performance characteristics.

Various particular embodiments will not be described, wherein such embodiments are exemplary in nature and are not intended to be limiting as to the scope of the claims. In a first example, the first processor 102 and the first near memory 106 may reside in a server, and the far memory 110 may be a memory blade or memory bank that is accessible to the server and several other servers. In another example, as mentioned previously, the processors 102-104 may be multi-core processors resident on a server, and the near memories 106-108 may be on-chip memories. In this example, the near memory 106 is accessible to each core on the multi-core processor. Furthermore, the far memory 110 may be off-chip memory. In such an embodiment, the near memories 106-108 may be DRAM that is stacked on the processors 102-104, respectively, through utilization of 3D die stacking, and the far memory 110 may be some form of off-chip memory. While certain examples have been provided, it is to be understood that any suitable hierarchical asymmetric memory scheme is contemplated and intended to fall under the scope of the hereto-appended claims.

Figure 2:
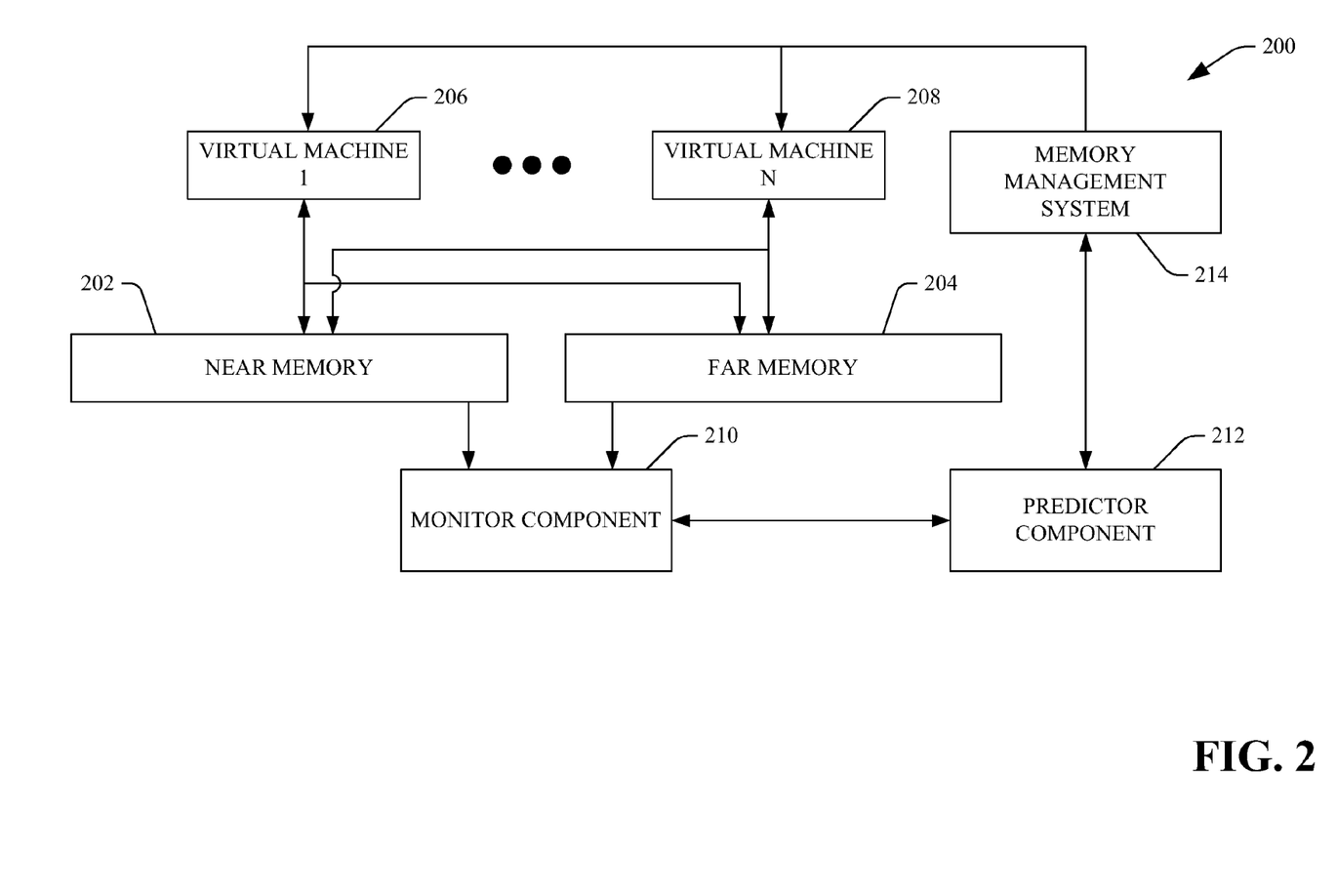
FIG. 2 is a functional block diagram of an exemplary system that facilitates managing asymmetric memory pools in a virtualized system.

Referring now to FIG. 2, an exemplary system 200 that facilitates managing asymmetric memory pools in a virtualized system is illustrated. The system 200 comprises near memory 202 and far memory 204, wherein the performance characteristics of the near memory 202 are different than the performance characteristics of the far memory 204 with respect to a processor or processor core. The system 200 additionally comprises a plurality of virtual machines 206-208, wherein each of the virtual machines 206 has portions of the near memory 202 and portions of the far memory 204 allocated thereto. Specifically, each of the virtual machines 206-208 has a contiguous virtual address space assigned thereto, and such contiguous virtual address space can map to portions of the near memory 202 and the far memory 204. In an example, the virtual machines 206-208 can share resources of a processor, such that the processing cycles of the processor are shared between the virtual machines 206-208 depending upon workloads corresponding thereto. In another embodiment, each of the virtual machines 206-208 can be assigned to a core of a multi-core processing chip. Of course, other implementations are also contemplated and are intended to fall under the scope of the hereto-appended claims.

The system 200 further comprises a monitor component 210 that monitors accesses to the near memory 202 and the far memory 204 by the virtual machines 206-208 over time. For instance, the monitor component 210 can be configured to monitor accesses to each page in the virtual address spaces corresponding to the virtual machines 206-208, which may map to the near memory 202 and the far memory 204. In a particular example, the monitor component 210 can track memory usage of the virtual machines 206-208 by way of hardware access bits. More specifically, the monitor component 210 can inspect and clear access bits associated with nested table entries that describe a mapping between guest physical addresses (GPA) and system physical addresses (SPA) (e.g., the mapping between the virtual address space and the system address space). In an example, the monitor component 210 can make a hypercall to a hypervisor (not shown) to inspect and clear such access bits. Furthermore, the monitor component 210 can analyze the access bits periodically (e.g., once per second).

A predictor component 212 is in communication with the monitor component 210, and can predict future accesses to pages in the near memory 202 and pages in the far memory 204 by each of the virtual machines 206-208. More particularly, the predictor component 212 can output data that is indicative of the likelihood that a given guest physical page will be accessed consistently in the near future. In an example, the predictor component 212 can receive historic access patterns with respect to pages in the near memory 202 and far memory 204 from the monitor component 210 and can, for a given guest physical page, predict a likelihood that the guest physical page will be accessed by a virtual machine that corresponds to such guest physical page. The predicted likelihood may be binary, in that the predictor component 212 outputs an indication that a guest physical page is either likely to be accessed by a virtual machine or not likely to be accessed by the virtual machine. Alternatively, the predictor component 212 can output predictions with more granularity, such as a value that lies on a continuous scale or within one of several possible levels of likelihood of access.

In an exemplary implementation, the predictor component 212 can employ one or more of spatial filtering or temporal filtering with respect to a given guest physical page to predict the likelihood that the guest physical page will be accessed in the near future. For instance, the algorithm shown below can be executed by a processor, wherein such algorithm is a temporal filtering algorithm that utilizes a history window of size W:

$$\text{Prediction}[k] = \frac{\sum_{i=0}^{W} AccessBit[k-i]}{W}, \quad (1)$$

where AccessBit[k] is one if the access bit for the page was set during a sampling of such page and zero otherwise. If Prediction[k] is greater than or equal to a predefined threshold (e.g., between zero and one), the predictor component 212 can predict that the page will be accessed in the near future by the corresponding virtual machine. Otherwise, the predictor component 212 can predict that the page will not be accessed in the near future. It is to be understood that the history window size W and the aforementioned predefined threshold can be configurable parameters. Other models, including statistical models and/or machine learning models can also be employed to predict future access patterns of pages across asymmetric memory pools.

The system 200 can further comprise a memory management system 214 that is in communication with the predictor component 212. Specifically, the memory management system 214 can receive predictions with respect to particular pages across the asymmetric memory pools and can perform two operations: 1) dynamically allocate the near memory 202 to the virtual machines 206-208 based at least in part upon the predictions provided by the predictor component 212; and 2) migrate pages allocated to a virtual machine between asymmetric memory pools (between the near memory 202 and the far memory 204) based at least in part upon the predictions provided by the predictor component 212. These operations will be described in greater detail below.

The memory management system 214, from an architectural standpoint, can reside in a variety of locations. For instance, the memory management system 214 may be implemented as a portion of a hypervisor. In another example, the memory management system 214 may be included in guest operating systems that are executing on the virtual machines 206-208. In other words, the guest operating systems can be made aware of the different semantics of the asymmetric memory (the near memory 202 and the far memory 204), and the hypervisor can update the guest operating systems when allocations of near memory and far memory are varied over time. In still yet another example, the memory management system 214 may execute transparently to guest operating systems.

Figure 3:
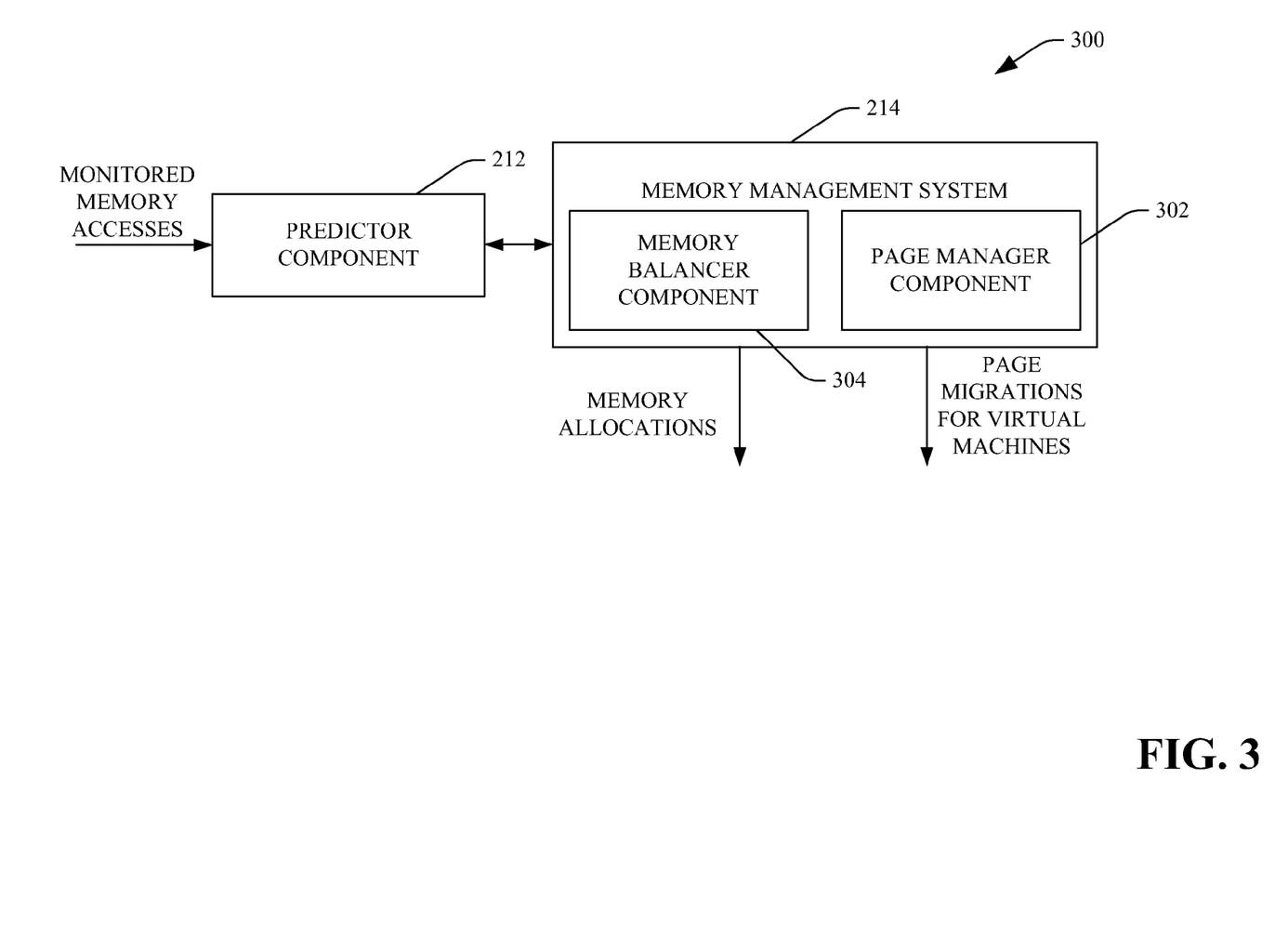
FIG. 3 is a functional block diagram of an exemplary system that facilitates managing asymmetric memory pools in a virtualized system.

Turning now to FIG. 3, an exemplary system 300 that facilitates managing asymmetric memory pools in a virtualized system is illustrated. The system 300 comprises the predictor component 212 and the memory management system 214, which generally act as described above. Specifically, the predictor component 212 receives monitored accesses to asymmetric memory pools by one or more virtual machines and, based upon such monitored accesses, outputs data that is indicative of a likelihood that any given page in the asymmetric memory pools will be accessed in the near future by a virtual machine that has been allocated physical memory corresponding to such page. The predictor component 212 can generate these predictions for each page in the near memory and the far memory that has been allocated to virtual machines and/or may be allocated to virtual machines.

The memory management system 214 receives the prediction data and manages memory allocation across virtual machines and data location between near and far memory based at least in part upon the prediction data. With more particularity, the memory management system 214 comprises a page manager component 302 and a memory balancer component 304. The page manager component 302 receives the prediction data from the predictor component 212 and dynamically determines whether pages are desirably migrated between pools of asymmetric memory (e.g., between near memory and far memory). In an example, the prediction data received by the page manager component 302 can be in the form of two lists: 1) Near Memory Candidates—a list of pages in far memory that are desirably included in the near memory (e.g., pages that are likely to be accessed in the near future); and 2) Far Memory Candidates—a list of pages that are in the near memory that desirably included in the far memory (e.g., pages that are not likely to be access in the near future or are likely to be accessed less than other pages). The predictor component 212 can generate such lists based at least in part upon the monitored memory accesses by one or more virtual machines. Of course, other formats of data are also contemplated, such as when the predictor component 212 is configured to output predictions of page accesses on a continuous scale.

The page manager component 302 can receive such lists and determine an appropriate set of guest physical pages that are desirably mapped to near memory, and, where necessary, identify pages to evict from near memory (to be placed in far memory). An exemplary algorithm is provided herein, wherein the algorithm can be employed by the page manager component 302 to migrate pages between near and far memory with respect to a virtual machine.

1:    if Free Near Memory < Memory needed for Near Memory Candidates
      Then
2:       Number of Pages in Near Memory to Evict = the lesser of (Memory needed for Near Memory Candidates − Free Near Memory) or Memory needed for Far Memory Candidates
3:       Migrate the Number of Pages in Near Memory to Evict of Far Candidates from the near memory to the far memory
4:    End if
5:    Migrate Near Memory Candidates from Far Memory to Near Memory In an exemplary implementation, to avoid memory churn, the page manager component 302 can limit eviction to inactive pages in near memory. Thus, if there are no candidates for eviction, the page manager component 302 will not migrate pages from far memory to near memory even if the pages in far memory are included as being near memory candidates. In other implementations, however, a global analysis may be undertaken to ascertain optimal positioning of pages between near and far memory based at least in part upon the prediction data output by the predictor component 212. For instance, even if all pages in near memory are active, the page manager component 302 can determine that the virtual machine corresponding to the GPA space will operate more efficiently if particular pages are migrated between near and far memory.

Thus, the page manager component 302 can, for each virtual machine executing in a virtualized system, dynamically manage pages allocated to a given virtual machine between near memory and far memory to enhance performance of the virtual machine in a computing environment that includes asymmetric memory pools.

The memory balancer component 304 can perform a different task—the balancing of near memory across multiple virtual machines that have been allocated portions of such near memory. The memory balancer component 304 can perform such balancing based at least in part upon the prediction data output by the predictor component 212. Further, in an example, the memory balancer component 304 can perform a balance of near memory for several virtual machines, and the page manager component 302 can subsequently manage pages for such virtual machines after an appropriate amount of near memory (and far memory) has been allocated thereto.

With more specificity, the memory balancer component 304 can act to balance near memory across virtual machines executing in a virtualized system based at least in part upon the prediction data output by the predictor component 212. The memory balancer component 304 thus acts to exploit temporal variations in memory usage intensity and capacity across the execution of a set of consolidated virtualized workloads. The memory balancer component 304 can periodically access or receive prediction data from the predictor component 212. The frequency of memory balancing undertaken by the memory balancer component 304 may be less than the frequency of page management undertaken by the page management component 302, may be greater than the frequency of page management undertaken by the page management component 302, or may be equal to the frequency of page management undertaken by the page management component.

To perform memory balancing, the memory balancer component 304 can, for each virtual machine, compute the predicted active memory capacity: $MEM_{active,i}$. Given a global constraint on an amount of near memory, $MEM_{Near}$, the memory balancer component 304 can allocate near memory across virtual machines (e.g., using a weighted fair share approach) as follows:

$$MEM_{Near,i} = MEM_{Near} \times \frac{MEM_{active,i}}{\sum_{i=0}^{N} MEM_{active,i}}. \quad (2)$$

It will be readily recognized that other constraints may be set forth other than total amount of near memory, including a minimum amount of near memory required to be given to any particular virtual machine executing on the virtualized system, a maximum amount of near memory that may be given to a virtual machine executing on the virtualized system, or other constraints included in service level agreements (SLAs) for any particular virtual machine.

Figure 4:
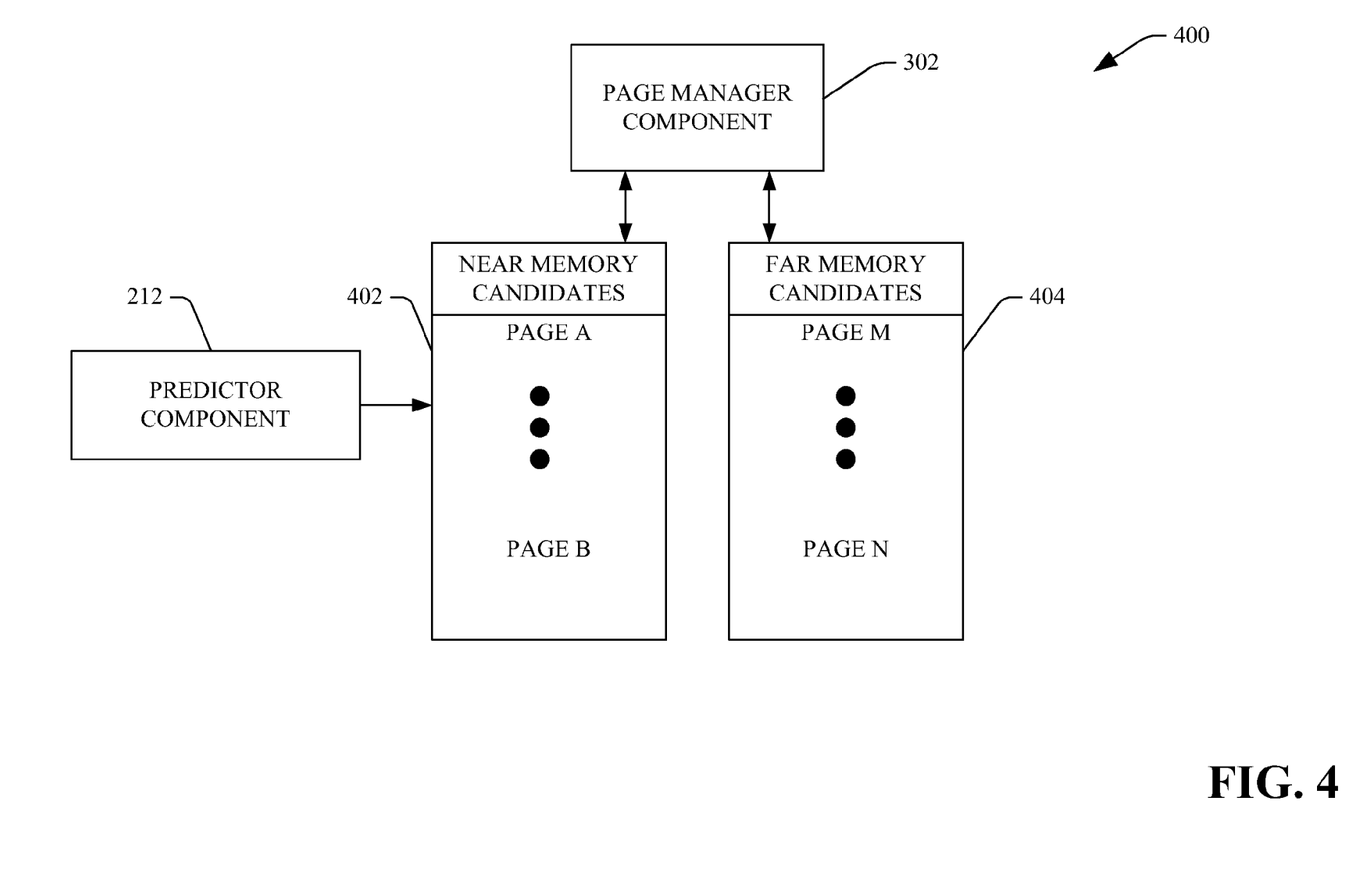
FIG. 4 illustrates page migration in a virtualized system with asymmetric memory pools.

Turning now to FIG. 4, an exemplary system 400 that facilitates managing pages in a hierarchical memory computing environment is illustrated. The system 400 comprises the predictor component 212, which receives data pertaining to how a virtual machine accesses pages in GPA allocated to the virtual machine. The predictor component 212 then outputs two lists: a first list 402 that identifies near memory candidates (pages in far memory that are predicted to be accessed by the virtual machine in the near future and are thus desirably migrated to near memory) and a second list 404 that identifies far memory candidates (pages in near memory that are not predicted to be accessed in the near future by the virtual machine and are thus desirably migrated to far memory). These lists may be binary, such that all pages in the first list 402 are treated the same and all pages in the second list 404 are treated the same. In other embodiments, however, scores may be assigned to pages in the lists 402 and 404, wherein such scores indicate a desirability of migrating the corresponding pages between asymmetric memory pools. The page manager component 302 then migrates pages between asymmetric memory pools based at least in part upon the content of the first list 402 and the second list 404.

Figure 5:
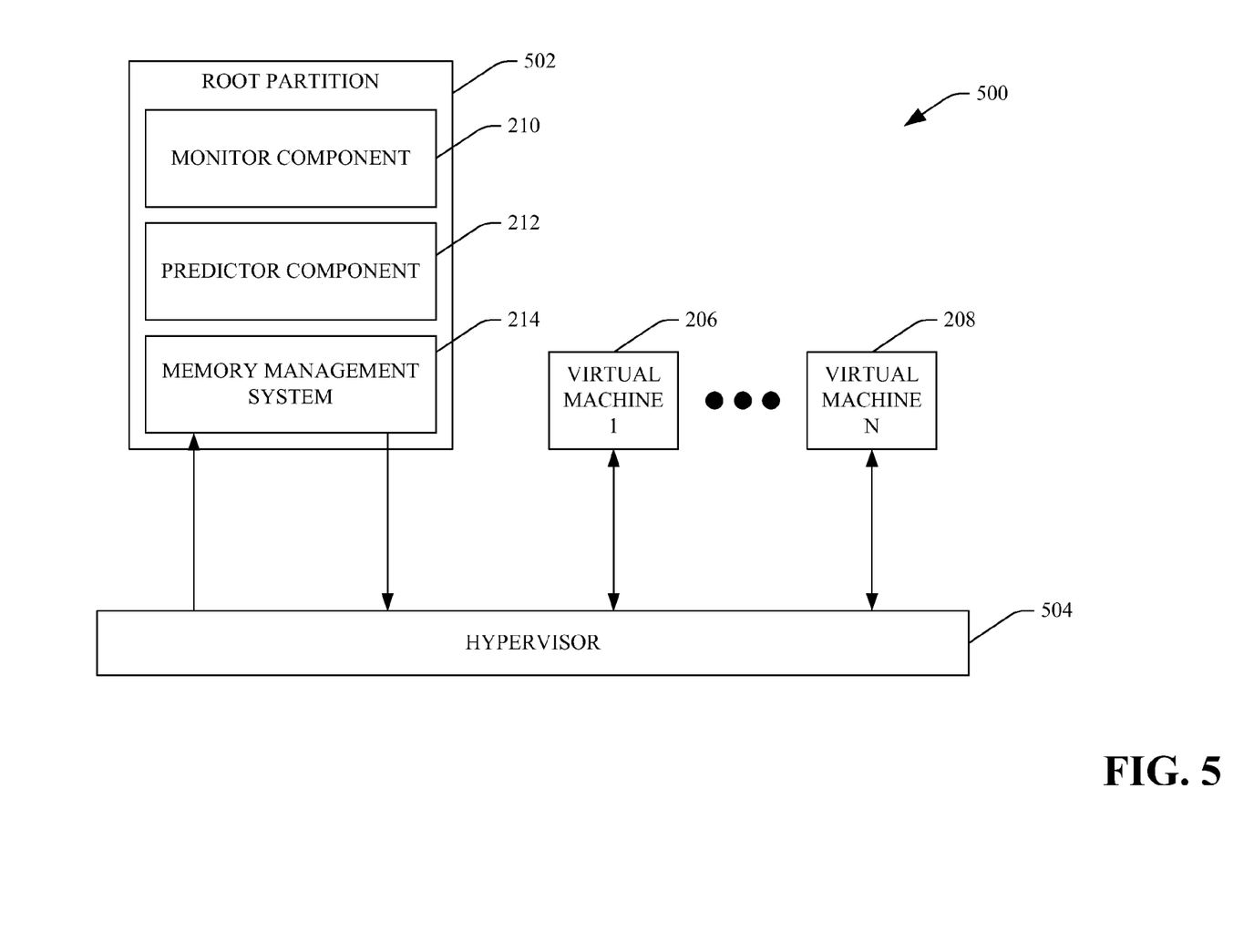
FIG. 5 is a functional block diagram of an exemplary embodiment of a memory management system in a virtualized system with asymmetric memory pools.

Now referring to FIG. 5, an exemplary system 500 that facilitates managing asymmetric memory pools in a virtualized system is illustrated. The system 500 illustrates one exemplary embodiment of how the memory management system 214 can be implemented. It is to be understood, however, that other embodiments are contemplated and are intended to fall under the scope of the hereto-appended claims. In this exemplary embodiment, it can be noted that execution of the monitor component 210 and the memory management system 214 can result in execution overheads. In some instances, then, the use of large pages in nested page tables used to translate GPAs to SPAs can be disabled (although virtual machines may internally apply large pages for translating guest virtual addresses (GVAs) to GPAs). Additionally, page access bit scanning may require performance overheads of TLB flushes whenever access bits are checked and cleared.

The system 500 comprises the monitor component 210, the predictor component 212, and the memory management system 214, which can reside in the root partition 502 of the physical machine. In this example, the monitor component 210, the predictor component 212, and/or the memory management system 214 can inspect and clear access bits associated with nested page table entries that describe a mapping between GPAs and SPAs. The system 500 further comprises a hypervisor 504, and the monitor component 210, the predictor component 212, and/or the memory management system 214 can transmit a hypercall to the hypervisor 504 to perform this functionality. Additionally, the memory management system 214 can have an interface corresponding thereto that allows the memory management system 214 to dynamically modify the system physical page used to back a guest physical page, including copying data and updating page table entries to reflect a new mapping.

Figure 6:
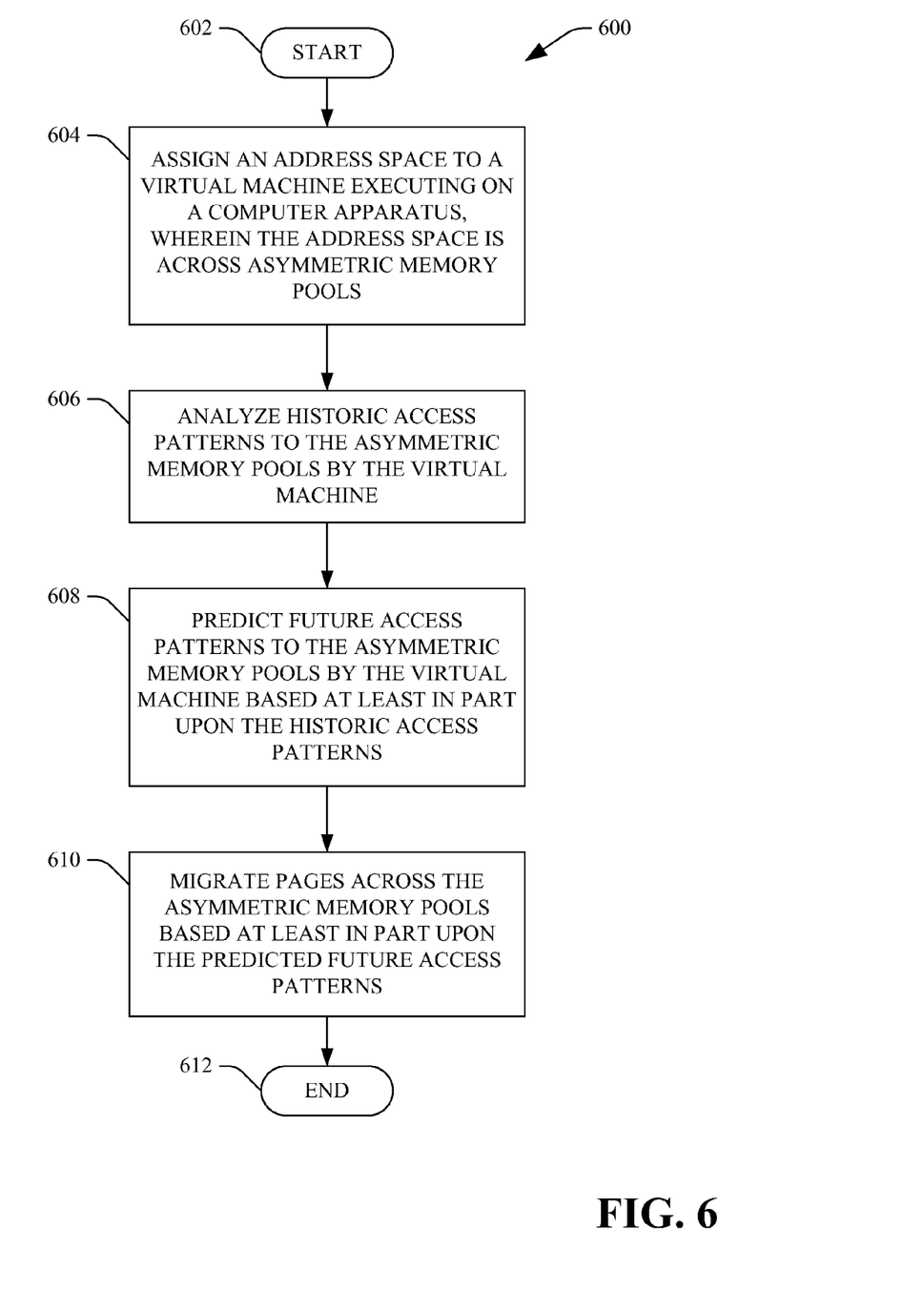
FIG. 6 is a flow diagram that illustrates an exemplary methodology for migrating pages across asymmetric memory pools in a virtualized system.
Figure 7:
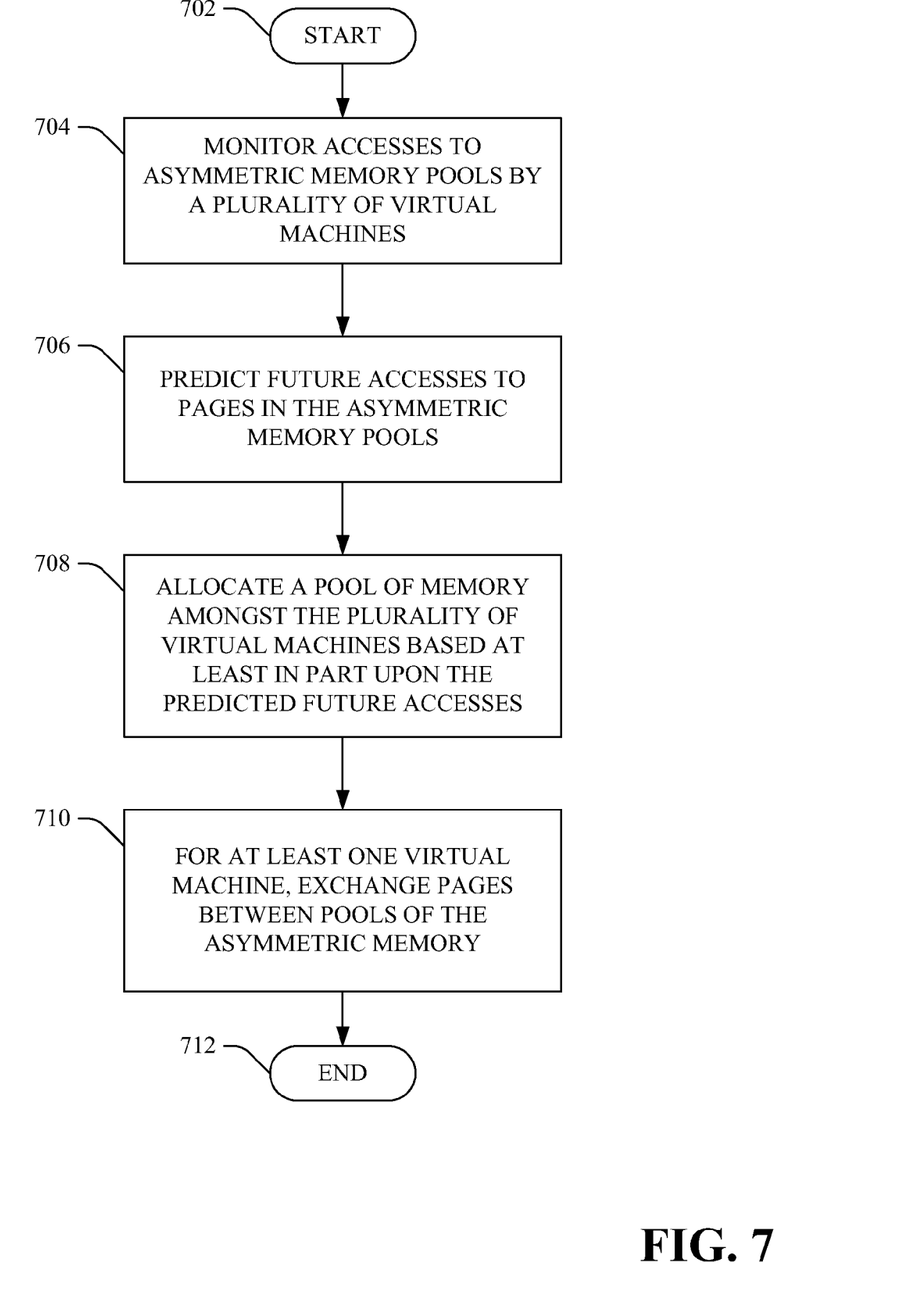
FIG. 7 is a flow diagram that illustrates an exemplary methodology for managing memory allocation across asymmetric memory pools in a virtualized system.

With reference now to FIGS. 6-7, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Referring now to FIG. 6, a methodology 600 that facilitates active page management in a virtualized system with asymmetric memory pools is illustrated. The methodology 600 begins at 602, and at 604 an address space in physical memory is assigned to a virtual machine executing on a computer apparatus. This address space can be mapped to a guest physical address space in a nested table. In this exemplary methodology, the system address space assigned to the virtual machine is across asymmetric memory pools. That is, at least one page corresponding to the virtual machine resides in a near memory and at least one page corresponding to the virtual machine resides in a far memory.

At 606, historic access patterns to the asymmetric memory pools by the virtual machine are analyzed. Such access patterns can be obtained by monitoring access bits corresponding to portions of the memory pools. At 608, future access patterns to the asymmetric memory pools by the virtual machine are predicted based at least in part upon the historic access patterns analyzed at 606. For instance, for each page in the asymmetric memory pools allocated to the virtual machine, data indicative of the likelihood that such pages will be accessed in the near future (e.g., within a threshold amount of time) can be generated.

At 610, pages allocated to the virtual memory are migrated across the asymmetric memory pools based at least in part upon the predicted future access patterns. For instance, a page in far memory can be migrated to near memory and/or a page in near memory can be migrated to far memory. The methodology 600 completes at 612.

With reference now to FIG. 7, an exemplary methodology 700 that facilitates actively managing memory across asymmetric memory pools during runtime of a virtual machine executing on a computing apparatus is illustrated. The methodology 700 begins at 702, and at 704 accesses to asymmetric memory pools by a plurality of virtual machines are monitored. For instance, access bits corresponding to a near memory and a far memory can be accessed and retained over a threshold window of time.

At 706, future accesses to pages in the asymmetric memory pools are predicted based at least in part upon the monitored accesses to the memory pools obtained at 704. At 708, at least one of the pools of asymmetric memory is allocated amongst the plurality of virtual machines based at least in part upon the predicted future accesses. At 710, for at least one virtual machine, pages between pools of the asymmetric memory are exchanged based at least in part upon the predicted future access to the pages in the asymmetric memory pools. The methodology 700 completes at 712.

Figure 8:
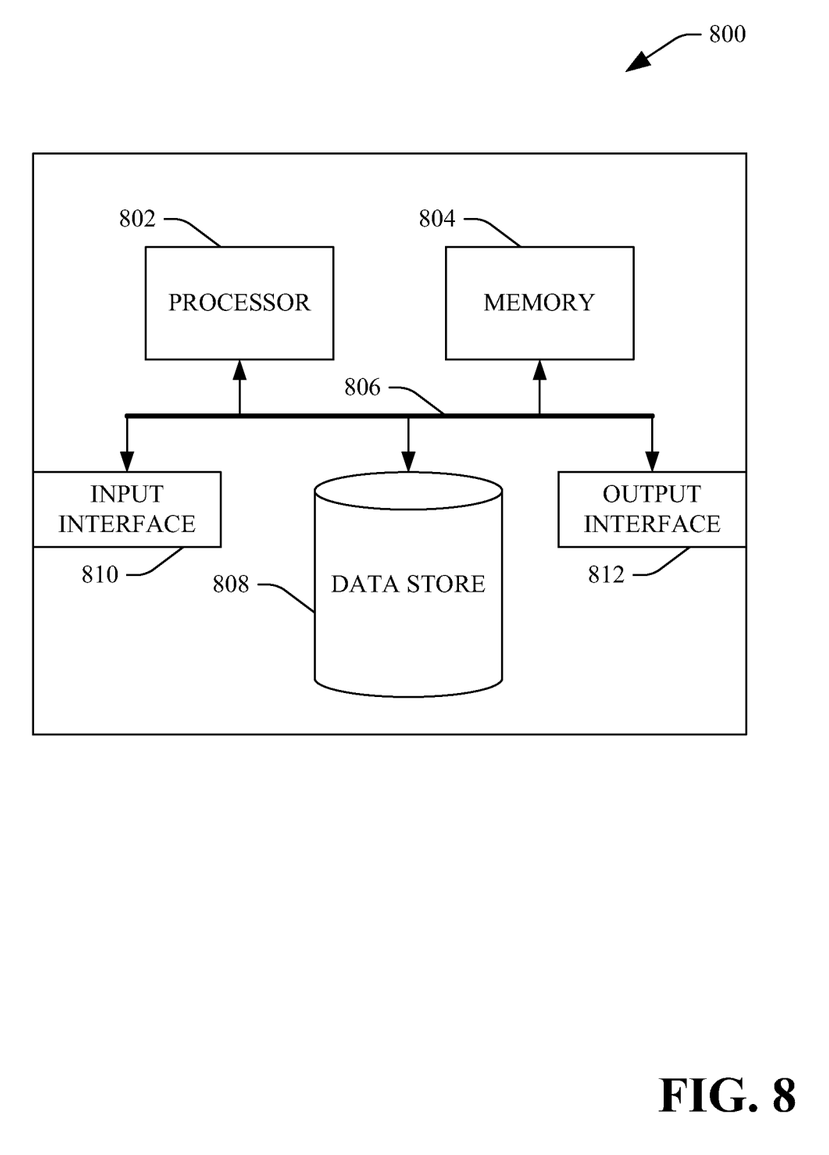
FIG. 8 is an exemplary computing system.

Now referring to FIG. 8, a high-level illustration of an exemplary computing device 800 that can be used in accordance with the systems and methodologies disclosed herein is illustrated. For instance, the computing device 800 may be used in a system that supports allocating a pool of memory in a virtualized system that comprises asymmetric memory pools. In another example, at least a portion of the computing device 800 may be used in a system that supports migrating pages between different memory hierarchies in a virtualized system that utilized asymmetric memory pools. The computing device 800 includes at least one processor 802 that executes instructions that are stored in a memory 804. The memory 804 may be or include RAM, ROM, EEPROM, Flash memory, or other suitable memory. Additionally, the memory 804 may be asymmetric memory that comprises different pools, wherein the pools have different performance characteristics with respect to the processor 802. The instructions in the memory 804 may be, for instance, instructions for implementing functionality described as being carried out by one or more components discussed above or instructions for implementing one or more of the methods described above. In other words, the components discussed herein may be computer-executable components that can reside in memory, and can perform the acts described herein upon the processor 802 executing such components. The processor 802 may access the memory 804 by way of a system bus 806. In addition to storing executable instructions, the memory 804 may also store a near memory candidate list, a far memory candidate list, monitored accesses to memory pools, etc.

The computing device 800 additionally includes a data store 808 that is accessible by the processor 802 by way of the system bus 806. The data store 808 may be or include any suitable computer-readable storage, including a hard disk, memory, etc. The data store 808 may include executable instructions, near and far memory candidate lists, access data pertaining to hierarchical memory pools, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A system, comprising:
   near memory;
   far memory, wherein a performance characteristic of the near memory is non-identical to the performance characteristic of the far memory;
   at least one processor that is configured to execute:
      a first virtual machine that is allocated a first portion of the near memory and a first portion of the far memory;
      a second virtual machine that is allocated a second portion of the near memory and a second portion of the far memory;
      a predictor component that is configured to predict:
         accesses to the first portion of the near memory and accesses to the first portion of the far memory by the first virtual machine; and
         accesses to the second portion of the near memory and accesses to the second portion of the far memory by the second virtual machine; and
      a memory management system that is configured to allocate the first portion of the near memory to the second virtual machine based upon the accesses to the first portion of the near memory, the first portion of the far memory, the second portion of the near memory, and the second portion of the far memory predicted by the predictor component.

2. The system of claim 1, wherein the first portion of the near memory is a page.

3. The system of claim 1, wherein the performance characteristic is latency with respect to the at least one processor, such that latency of the near memory is less than a latency of the far memory.

4. The system of claim 1, wherein the performance characteristic is bandwidth with respect to the at least one processor, such that bandwidth of the near memory is greater than bandwidth of the far memory.

5. The system of claim 1, the at least one processor comprises a first processor core and a second processor core, the first virtual machine executes on the first processor core and the second virtual machine executes on the second processor core.

6. The system of claim 5, wherein the near memory is memory on a chip that comprises the first processor core and the second processor core.

7. The system of claim 5, wherein the far memory is a memory bank that is accessible to the first processor core and the second processor core.

8. The system of claim 1, wherein the memory management system is configured to allocate pages of the near memory to a plurality of other virtual machines.

9. The system of claim 1, wherein the memory management system, when allocating the first portion of the near memory to the second virtual machine, migrates a page in the near memory that is allocated to the first virtual machine to a page in the far memory.

10. A method comprising the following computer-executable acts:
mapping a first address space for a first virtual machine executing on a computing apparatus, across a near memory and a far memory, such that the first virtual machine is allocated a first portion of the near memory and a first portion of the far memory, wherein a performance characteristic of the near memory is non-identical to the performance characteristic of the far memory;
mapping a second address space for a second virtual machine executing on the computing apparatus across the near memory and the far memory, such that the second virtual machine is allocated a second portion of the near memory and a second portion of the far memory;
obtaining historic accesses by the first virtual machine to the first portion of the near memory and the first portion of the far memory;
predicting future accesses by the first virtual machine to the first portion of the near memory and the first portion of the far memory based upon the historic accesses by the first virtual machine to the first portion of the near memory and the first portion of the far memory; and
updating the mapping of the first address space and the second address space based upon the predicting of the future accesses by the first virtual machine to the first portion of the near memory and the first portion of the far memory.

11. The method of claim 10, wherein obtaining historic accesses by the first virtual machine to the first portion of the near memory and the first portion of the far memory comprises monitoring access bits corresponding to the first portion of the near memory and the first portion of the far memory.

12. The method of claim 10, wherein the near memory is memory located on a chip that comprises a multi-core processor.

13. The method of claim 10, wherein the far memory is a memory bank that is accessible to a plurality of processors.

14. The method of claim 10 configured for execution in a hypervisor that is executing on the computing apparatus.

15. The method of claim 10, wherein updating the mapping of the first address space and the second address space comprises:

migrating data in the first portion of the near memory to the far memory based upon the predicting of the future accesses by the first virtual machine to the first portion of the near memory and the first portion of the far memory; and
responsive to migrating the data, allocating the first portion of the near memory to the second virtual machine.

16. The method of claim 10, wherein predicting the future accesses by the first virtual machine to the first portion of the near memory and the first portion of the far memory comprises:
for each page in the first address space assigned to the first virtual machine, computing a metric that is indicative of a number of accesses to the page over a threshold amount of time; and
predicting the future accesses by the first virtual machine to the first portion of the near memory and the second portion of the far memory based upon the metric computed for the page.

17. The method of claim 10, wherein the first virtual machine is executed on a first core of a multi-core processor, and wherein the second virtual machine is executed on a second core of the multi-core processor.

18. A computer-readable memory comprising instructions that, when executed by a processor, cause the processor to perform acts comprising:
allocating a first portion of near memory and a first portion of far memory to a first virtual machine executing in a computing system, first virtual addresses assigned to the first virtual machine are mapped to the first portion of the near memory and the first portion of the far memory, the near memory has a first bandwidth and the far memory has a second bandwidth that is less than the first bandwidth;
allocating a second portion of the near memory and a second portion of the far memory to a second virtual machine executing in the computing system, second virtual addresses assigned to the second virtual machine are mapped to the second portion of the near memory and the second portion of the far memory;
based upon historic accesses by the first virtual machine to the first portion of the near memory and the first portion of the far memory, predicting future access patterns of the first virtual machine to the first portion of the near memory and the first portion of the far memory; and
responsive to predicting the future access patterns of the first virtual machine, allocating the second portion of the near memory to the first virtual machine, such that the first virtual addresses assigned to the first virtual machine are mapped to the first portion of the near memory and the second portion of the near memory.

19. The computer-readable memory of claim 18, the acts further comprising:
based upon historic accesses by the second virtual machine to the second portion of the near memory and the second portion of the far memory, predicting future access patterns of the second virtual machine to the second portion of the near memory and the second portion of the far memory; and
responsive to predicting the future access patterns of the second virtual machine, allocating the second portion of the near memory to the first virtual machine.

20. The computer-readable memory of claim 18, the acts further comprising:

responsive to predicting the future access patterns of the first virtual machine, allocating the first portion of the far memory to another virtual machine executing on the computing system.

* * * * *